United States Patent
Lum et al.

[11] Patent Number: 5,812,143
[45] Date of Patent: Sep. 22, 1998

[54] GENERAL PATTERN BLIT SOURCE TYPE

[75] Inventors: Sanford S. Lum, Scarborough; Adrian Hartog, Toronto; Jerzy Kielbasinski, Mississauga; Fridtjof Martin Georg Weigel, Scarborough, all of Canada

[73] Assignee: ATI Technologies Inc., Unionville, Canada

[21] Appl. No.: 888,887

[22] Filed: Jul. 7, 1997

Related U.S. Application Data

[63] Continuation of Ser. No. 437,023, May 8, 1995, abandoned.

[51] Int. Cl.[6] .................................................. G06F 15/00
[52] U.S. Cl. ............................................................ 345/438
[58] Field of Search .................................. 345/438, 113, 345/114, 525, 523

[56]                     References Cited
U.S. PATENT DOCUMENTS

| | | | |
|---|---|---|---|
| 4,700,320 | 10/1987 | Kapur | 364/521 |
| 5,218,674 | 6/1993 | Peaszee et al. | 395/166 |
| 5,255,360 | 10/1993 | Peaslee et al. | 395/162 |
| 5,313,576 | 5/1994 | Providenza et al. | 395/164 |
| 5,444,836 | 8/1995 | Lentz et al. | 395/141 |
| 5,444,839 | 8/1995 | Silverbrook et al. | 395/141 |

*Primary Examiner*—Phu K. Nguyen
*Attorney, Agent, or Firm*—Pascal & Associates

[57]                     ABSTRACT

A method of performing a bit block transfer (Bitblt) comprised of reading a pixel data sequence from a source trajectory, writing an X coordinate portion of the pixel data sequence to a destination trajectory, repeating the writing step to the end of a scan line in the event the X coordinate portion is smaller than the scan line, reset the X coordinate following the end of the scan line, reset a Y coordinate and write a successive X coordinate portion of the pixel data sequence to the destination register from an X coordinate start position when the Y coordinate actually advances in the pixel data sequence.

11 Claims, 2 Drawing Sheets

GENERAL PATTERN BLIT SOURCE TYPE

This is a continuation of U.S. patent application Ser. No. 08/437,023 filed May 8, 1995, now abandoned.

FIELD OF THE INVENTION

This invention relates to computers, and in particular to a method of drawing a pattern using a bit block transfer (bitblt) in a display processor.

BACKGROUND TO THE INVENTION

Widespread use of graphical user interface (GUI) based computer operating systems has created a demand for high performance graphics accelerators. GUIs perform bitblt operations (bit block transfers of image data from one part of display memory to another)) frequently. The bitblt operation is a basis for nearly all graphics accelerators.

In a bitblt operation, a source object such as a rectangle is copied to a destination rectangle. Normally the source rectangle is exactly the same size and follows the same direction as the destination rectangle, i.e. each pixel is moved the same number of pixels in the two plane coordinates X and Y from the source to the destination, although in the type Mach8 and Mach16 graphics accelerators manufactured by ATI Technologies the source object (referred to below as a rectangle for ease of understanding the invention) can be a different shape and each pixel move in a different direction to a destination. In those accelerators, a pattern to be copied from a source to a destination must be the same size as the destination rectangle, and the brush (fill tool) must be the same size. The source and destination referred to herein are virtual rectangles formed of pixel data stored in source and destination registers describing a memory area, which hold the pixel data for further processing and eventual display.

With a source area which tracks a destination area, the bit block transfers (bitblts) are strictly one-to-one; that is, every pixel on the destination trajectory corresponds exactly to one pixel on the source trajectory.

Such prior art bitblt processes to not provide for replication many times into a larger rectangle nor for zoom during the bitblt.

SUMMARY OF THE INVENTION

The present invention is a method of drawing patterns on a display by providing a general pattern source trajectory for specialized functions, such as replication many times into a larger rectangle and zooming.

A trajectory is a path that a memory controller traverses. Some properties of trajectories include shape, size and direction. In accordance with the present invention, source and destination trajectories may have different properties.

In accordance with an embodiment of the invention, a method of performing a bit block transfer (bitblt) is comprised of reading a pixel data sequence from a source trajectory, writing an X coordinate portion of the pixel data sequence to a destination trajectory, repeating the writing step to the end of a scan line while advancing the X coordinate in the event the source X coordinate portion is smaller than the destination scan line, resetting the X coordinate following the end of the scan line, resetting a Y coordinate and writing a successive X coordinate portion of the pixel data sequence to the destination trajectory from an X coordinate start position when the Y coordinate actually advances in the pixel data sequence.

More particularly, in the case where a source rectangle is smaller than the destination rectangle:

1) A source pixel is consumed and is written to the destination trajectory;
2) Both source and destination trajectories are advanced in the X-direction;
3) Steps 1–2 are repeated until a source pointer fully consumes the source scan line. Then the source pointer is reset to the beginning of the current source scan line;
4) Steps 1–3 are repeated until a destination scan line is completed. Then the destination pointer is set to the start of the next destination scan line and the source pointer is set to the start of the next source scan line. If the next source scan line is outside of the source region, then the source Y coordinate is reset to the beginning of the source rectangle;
5) Steps 1–4 are repeated until the destination trajectory is exhausted.

In the cases wherein the source rectangle is equal in size or larger than the destination rectangle, the same steps are used, and the source pointer does not reset in the Y direction if it is taller than the destination, nor does it reset in the X direction while the destination pointer is in mid-scan line if the source is longer than the destination.

In accordance with another embodiment, the aforenoted method includes the step of offsetting the source area with initial X and Y offsets, in effect applying an initial rotation to the source pattern.

In accordance with another embodiment, the step of rotating the block of pixel data includes aligning the block of source pixel data with a destination.

BRIEF INTRODUCTION TO THE DRAWINGS

A better understanding of the invention will be obtained by reading the description of the invention below, with reference to the following drawings, in which:

FIG. 1 illustrates a part of a rectangle defined by graphical data stored in source registers describing a memory area of a graphics processor, FIG. 2 illustrates the architecture of a graphics display portion of a digital computer, FIG. 3 illustrates in more detail the graphics processor portion of the digital computer of FIG. 2, FIG. 4 illustrates a source and destination in a source aligned bitblt operation, and FIG. 5 illustrates a source and destination in a destination aligned bitblt operation.

DETAILED DESCRIPTION OF THE INVENTION

Figure 1:
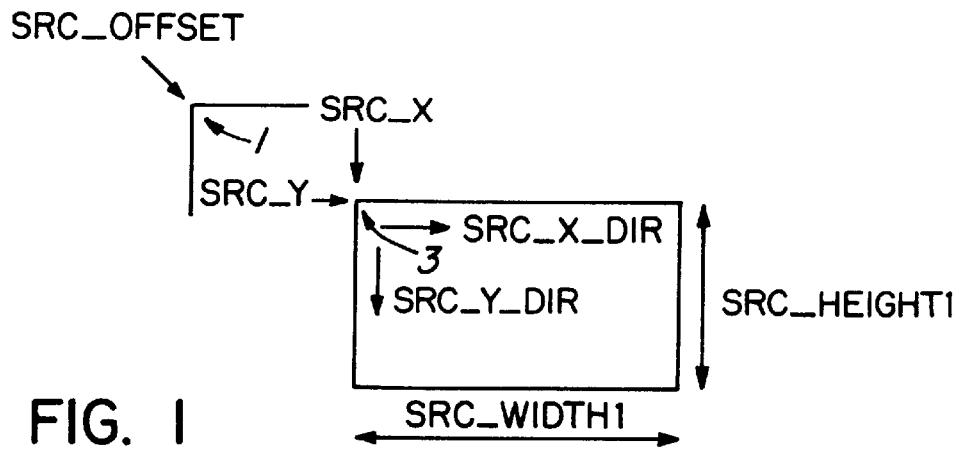

FIG. 1 is an illustration of a corner 1 of a source rectangle, which is defined by a source offset SRC_OFFSET, and is to be moved to a destination having a corresponding corner 3. The destination rectangle is defined by a source width SRC_WIDTH1, an X axis direction SRC_X_DIR and a Y axis direction SRC_Y_DIR.

Figure 2:
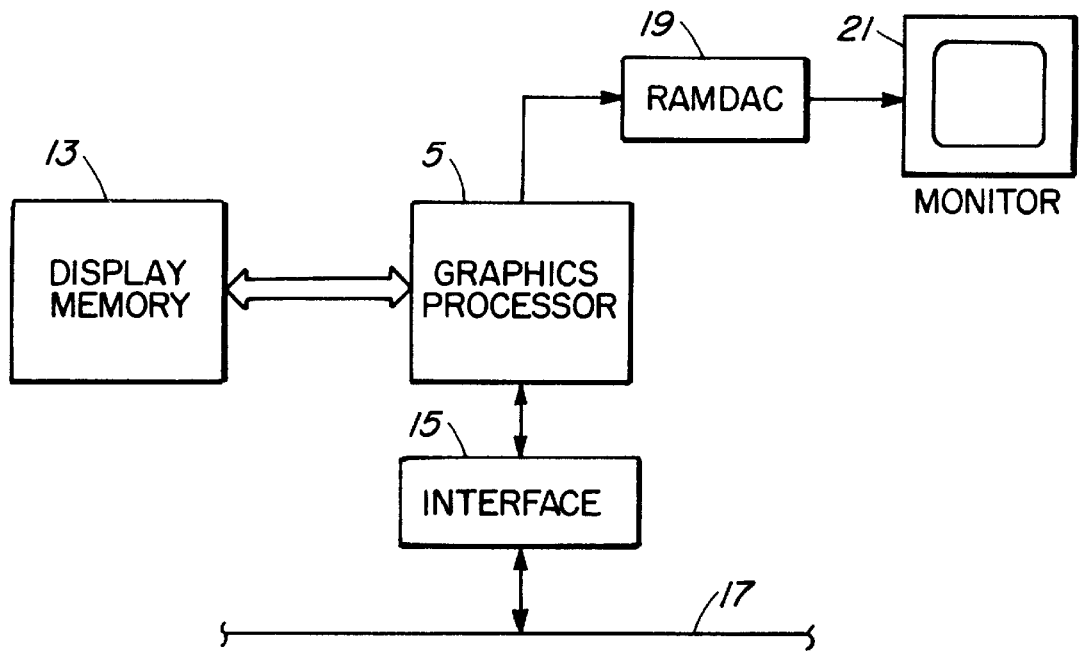
Figure 3:
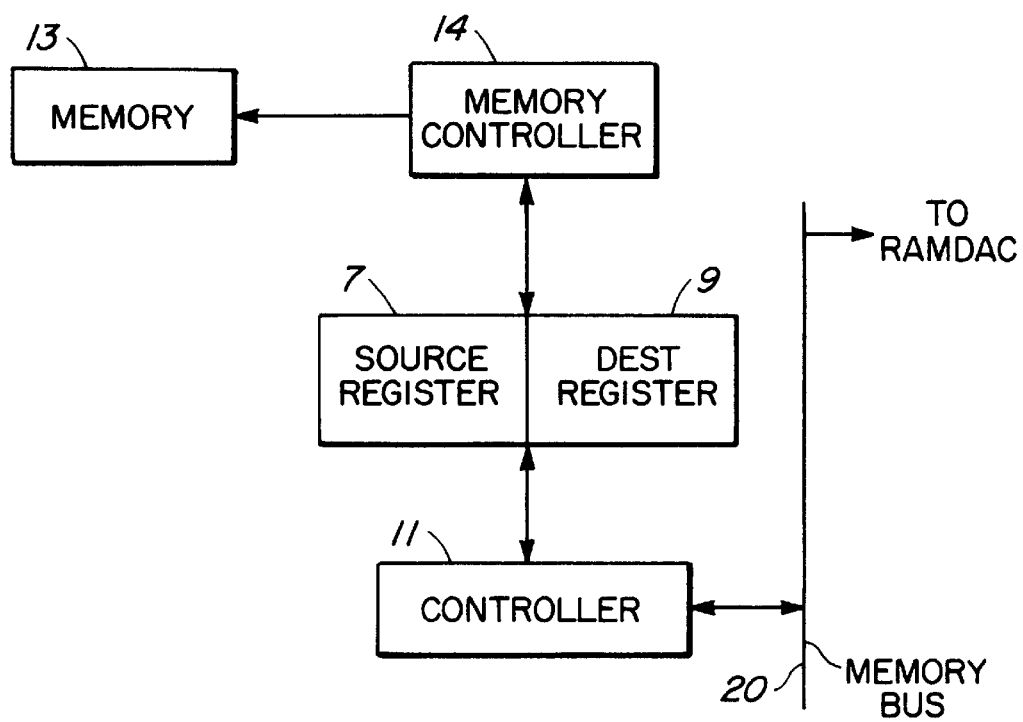

The bitblt process wherein the source rectangle is transferred to the destination can be carried out in a computer having an architecture for example as generally shown in FIGS. 2 and 3. A graphics processor 5 contains several registers, such as source register 7 and destination register 9, and is controlled by a controller 11 which can be comprised of a microprocessor or fixed function processor. The graphics processor stores and accesses display data in display memory 13, via memory controller 14 and receives instructions and provides information to the microprocessor of the digital computer (not shown) via interface 15 and bus 17. The graphics processor provides data for display to a RAM-DAC 19 via a memory SOS 20, where it is converted into RGB signals for display on a monitor 21.

Operation of the system illustrated in FIG. 2 is well known, and it and other graphics systems and programming methods are described in the texts "Graphics Programming For The 8514A", by Jake Richter and Bud Smith, published by M&T Publishing, Inc. of Redwood City, Calif., copyright 1990, and "Fundamentals of Interactive Computer Graphics", by J. D. Foley and A. Van Dam, published by Addison-Wesley Publishing Company of Reading, Mass., copyright 1992. To perform a bitblt operation, data from the source trajectory is transferred in one-to-one correspondence to the destination trajectory, from which it may be processed and stored in the display memory. The display memory then is read and display data is transferred to the RAMDAC, where a look-up table is consulted, RGB color data is obtained, the resulting signal is converted to analog, and is provided to the monitor 21 for display.

Figure 4:
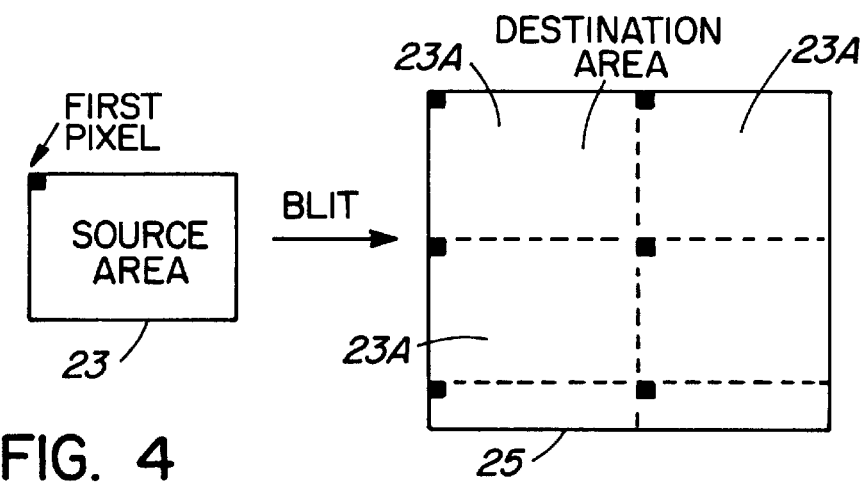

In accordance with the present invention, however, data is transferred in a different manner than one-to-one correspondence. In one embodiment, as shown in FIG. 4 a source area 23 is mapped to a destination area 25, and is source aligned, wherein the top left corner of the source area is aligned to the top left corner of the destination area. In the illustrated general-pattern source situation, wherein the source rectangle is not the same size as the destination rectangle, the source area is repeated plural times.

When the source is read by the controller 11 from the source register 7, and the end of the source scan line pattern in the X direction is reached, but the end of the destination scan line has not been reached, the X coordinate is reset to the value at its origin and is repeated; the Y coordinate is not incremented. Following the end of the destination scan line, the source Y coordinate register address pointer is advanced and at the same time the X coordinate pointer is reset to the value at its origin. When the maximum Y coordinate for the source has been reached but the destination scan size in the Y direction has not been reached, and when the X coordinate end of the scan line in the destination X direction has been reached, both the X and Y coordinate values of the source are reset to those of the X and Y origins of the source.

The result is repetition 23A of the source pattern, whereby an array of the source pattern in the destination is stored, for subsequent further processing if any and display.

Figure 5:
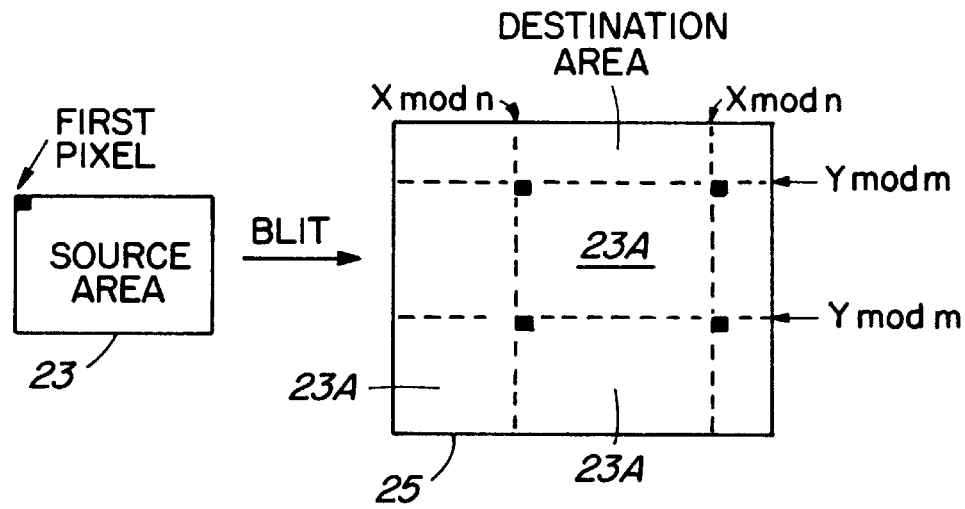

FIG. 5 illustrates the source 23 and destination 25 in a destination aligned bitblt case. In this case, the top left corner of the pattern of source area 23 is aligned to a destination coordinate, and the aforenoted method is repeated. The start of the bitblt is from an incremented source X and Y coordinate position.

While a particular embodiment of a bitblt operation from a source area which does not correspond to the size of a destination area has been described, other embodiments may be implemented.

In one such embodiment, the source shape is bounded in the Y direction. However whenever the bottom Y coordinate is exceeded in a top-to-bottom trajectory, the source register Y address pointer wraps around to the top. Similarly, when the top Y coordinate is exceeded in a bottom-to-top trajectory, the source register Y address pointer wraps around to the bottom.

In another embodiment, the Y coordinate is unbounded. In this case the source trajectory is entirely independent of the destination trajectory. Whenever the source register X address pointer reaches the end of the scan line, the source X coordinate is reset to the start X coordinate and the source Y pointer is advanced. This is similar to the case illustrated in FIG. 4, but in which there is a single column of patterns.

It should be noted that the end of the scan line need not be the end of the display scan line, but can be the end of the scan line in a GUI window, or can be the end of a scan line within a graphical outline, which need not be rectangular.

While a particular example of multiple replication of a small source in a larger destination window has been given above, it will be recognized that the destination window can alternatively be the same size as the source, or smaller. Single pixels can be multiplied in number before being carried by the bitblt process to the destination, thereby providing a zoom operation. Thus in general, the bitblt operation can be one-too-many, or a single source pixel may map to many destination pixels. These destination pixels may be grouped, to provide the aforenoted zoom operation, or may be in separate replications of the source.

In accordance with another embodiment, the source is to be destination aligned wherein the destination rectangle or outline is not in alignment with the source. In this case the controller 11 reads the original pixel data from a source trajectory (which for example can be constituted by the display memory 13), and rotates it by a rotation algorithm to a direction aligned with the destination.

Alternatively, the source need not be destination aligned, but at least one of the source trajectory X coordinate and Y coordinate can be offset, providing as initial rotation, prior to carrying out one of the bitblt methods described above.

A person understanding this invention may now conceive of alternative structures and embodiments or variations of the above. All of those which fall within the scope of the claims appended hereto are considered to be part of the present invention.

We claim:

1. A method of performing a bit block transfer (Bitblt) comprising:

(a) reading a pixel data sequence from a source trajectory, (b) writing an X coordinate portion of the pixel data sequence to a destination trajectory, (c) repeating the writing step of said X coordinate portion of the pixel data sequence to the end of a scan line in the event said X coordinate portion is smaller than the scan line, (d) resetting the X coordinate following the end of the scan line, (e) resetting a Y coordinate and writing a successive X coordinate portion of the pixel data sequence to the destination register from an X coordinate start position when the Y coordinate actually advances in the pixel data sequence.

2. A method as defined in claim 1 in which the scan line is the same length as said X coordinate portion.

3. A method as defined in claim 1 in which the scan line is contained within a window of a graphical user interface display.

4. A method as defined in claim 1 in which the scan line is larger than the length of said X coordinate portion of the byte sequence.

5. A method as defined in claim 1 including the step of reading a block of pixel data from a primary register, rotating said block and storing said block in the source register prior to the step of reading said byte sequence.

6. A method a defined in claim 5 in which the step of rotating the block of pixel data includes aligning the block of pixel data with a destination prior to storing said block in the source register.

7. A method as defined in claim 1 including the step of offsetting the pixel data sequence, defining a source area, with initial X coordinate and Y coordinate offsets, whereby an initial rotation is applied to the source area.

8. A method of performing a bit block transfer (bitblt) comprising:

(a) reading a source pixel from a source rectangle and writing said pixel to a destination rectangle, (b) advancing both source and destination trajectories in an X direction, (c) repeating steps (a) and (b) until a source pointer points to the end of a source scan line, then resetting the source pointer to the beginning of a current scan line of the source rectangle, (d) repeating steps (a), (b) and (c) using a same source pixel sequence until a destination scan line is completed, then setting a destination pointer to the start of a next destination scan line and setting the source pointer to the start of a next source scan line; in the event the next source scan line is outside of the source, then resetting the source Y coordinate in the beginning of the source rectangle, and (e) repeating steps (a)–(d) until the destination trajectory has been completed.

9. A method as defined in claim 8, including avoiding resetting the source pointer in the Y direction, in the event that the source rectangle is equal in size or is larger than the destination rectangle.

10. A method as defined in claim 8, including avoiding resetting the source pointer in the X direction while the destination pointer is in mid-scan line, in the event the source rectangle is larger than the destination rectangle.

11. In a computer which is comprised of a graphics processor having a source register and a destination register, a controller in said graphics processor for reading a scan line from said source register, and if the end of a source scan line is reached before the end of a destination scan line, repeating said source scan line and not incrementing the source scan in an orthogonal direction until the end of said destination scan line has been reached, thereby repeating a source pattern until the end of said destination scan line has been reached, and storing said repeated pattern in said destination register.

* * * * *